Dec. 6, 1960     W. D. WURDACK     2,963,385
NYLON COATING
Filed April 28, 1958
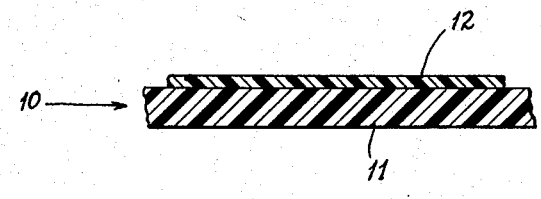
INVENTOR:
WILLIAM D. WURDACK,
BY Kingsland, Rogers & Ezell
ATTORNEYS

2,963,385

NYLON COATING

William D. Wurdack, 107 Cornelia Ave., St. Louis 22, Mo.

Filed Apr. 28, 1958, Ser. No. 731,120

6 Claims. (Cl. 117—73)

This invention relates to improvements in nylon coatings and, in particular, relates to a nylon coating which has excellent adhesion to the nylon and which can be used as a primer for further coatings or as a finished coating itself where desired.

In the past, a great deal of difficulty has been presented in formulating coatings for nylon which have good adherence to the nylon base. Such coatings in the form of lacquers using nitrocellulose base as an example have been subject to peeling off the nylon after a period of time, and have poor adhesion and stability. By means of the instant invention there has been provided a coating which can be sprayed or otherwise applied to a nylon base and used either as a primer or as a finished coating. When so used, additional lacquer coatings of conventional nitrocellulose lacquer may be applied on top of the coating with excellent adhesion which is not subject to peeling or any other deterioration or separation from the nylon base upon aging or weathering.

The instant invention is comprised of a formulation consisting of relatively few components which are readily available and simple to formulate and apply. These components are nontoxic, which is a very important consideration in the application of the coating, and are applicable in the form of liquid for convenience and use. The adhesion of the nylon coating of this invention is quite excellent and resists any tendencies for separation or deterioration upon aging, weathering, or hard service. Since conventional applications are to football helmets, sporting goods, and toys of various kinds, which are subject to a great deal of wear and tear, it can be readily understood that such stand-up under hard wear and service conditions is extremely important.

Basically, the formulation consists of formic acid employed as a non-toxic solvent of the nylon, a resin material, nitrocellulose, a plasticizer, and a nitroparaffin, which is used as an extender for the formic acid and a solvent for the nitrocellulose. These components are available in commerce and are simply formulated without any difficulties in formulation control, which makes this formulation of great advantage in preparation and application.

It is accordingly a primary object of this invention to provide a coating and method of applying a coating to nylon which has extremely firm adhesion and resists wear and tear and aging.

A further object of this invention is to provide a nylon coating and method of applying it comprising formic acid and synthetic resins, which have firm adhesion and good stability upon the nylon.

Still a further object of this invention is to provide a nylon coating and method of applying it comprising formic acid and synthetic resins and nitroparaffin.

Yet a further object of this invention is to provide a nylon coating and method of applying it comprising formic acid, a nitroparaffin, a synthetic resin comprising nitrocellulose, which has a high degree of stability and adhesion to the nylon.

Yet a further object of this invention is to provide a nylon coating and method of applying it comprising formic acid, a nitroparaffin, a resin of the dibasic acid ester condensate type with a high acid number.

Yet a further object of this invention is to provide a nylon coating and method of applying it comprising formic acid, a nitroparaffin, nitrocellulose, and a dibasic acid ester condensate resin with a high acid number.

Still another object of this invention is to provide a nylon coating and method of applying it comprised of readily available materials which are nontoxic and simple to apply in liquid form without any complicated techniques involved, and which is relatively inexpensive in cost.

Still other objects of this invention will be readily apparent to those skilled in the art and will be further apparent in the description which follows.

For the purpose of example there is shown in the accompanying drawing typical embodiment of a nylon coated article. The single figure shows a nylon backing having the coating of this invention.

In the formulation of this invention, formic acid has been found to be an essential ingredient. It acts as a solvent for the nylon surface when the coating is applied to it, and provides very firm adhesion of the coating. The desirable range is between about 6% to about 10%. Beyond these percentages in the coating formulation it has been found that there is an undesirable odor or plasticizer kick-out. For optimum performance it has been found that 7.2% of the pure formic acid may be employed, or when working with a commercial grade 8% of 90% formic acid strength is desirable.

The second important component in this invention is the nitroparaffin. Such nitroparaffin should be liquid and therefore of relatively low number of carbon atoms. As an example, 2-nitropropane has been found to be very desirable as it extends the solvent characteristics of the formic acid upon the nylon. Other liquid nitroparaffins such as 1-nitropropane, nitroethane and nitromethane, for example, are also suitable. The nitroparaffin also acts as a solvent for the nitrocellulose and the dibasic acid ester resin later to be described to provide for full compatibility of the coating formultion. It has been found that from about 10% to about 40% nitroparaffin should be employed by weight in the coating formulation. Under 10% of the nitroparaffin adhesion is poor.

The nitrocellulose employed in this coating may be of any conventional grade or degree of nitrogenation. It should be employed in liquid form with the conventional solvents employed for nitrocellulose. Various viscosity types can be used.

The dibasic acid ester condensate is employed to hold on to the nylon once the formic acid has worked in as a solvent. Such a resin may be the industrial resin conventionally made by a reaction such as the Diels-Alder condensation of rosin and fumaric or maleic acid. Rosin or colophony, as it is also known, is high in abietic acid and there is produced a dibasic acid ester condensate having a high acid number, which in this invention is desirably above 50. The resins should be employed in the ratio of at least about 2 parts of the dry resin to 1 part of the dry nitrocellulose by weight.

Lastly, a plasticizer is employed which may be any conventional resinous or oil-type placticizer, such as butyl benzyl phthalate or polyglycol di (2-ethyl hexoate).

In the formulation of this invention, it has been found desirable to formulate the coating as a liquid so it may be directly applied by the applicator in liquid form to the nylon from a spray gun or by use of brushes and the like. Where desired, however, the formulation may be broken down into separate mixes of several of the component parts which may be mixed together shortly prior to the time of use. In this formulation, the dibasic acid ester condensate and the nitrocellulose are both used with solvents for ease in formulation. The liquid solution of the dibasic acid ester condensate is made by cutting the resinous condensate with twice its weight in ethanol. Thus, the resultant solution is of 33⅓% strength dibasic acid condensate.

The nitrocellulose resin solution is conveniently prepared by using a number of compatible solvents. A typical formulation for the nitrocellulose resin solution is as listed below:

NITROCELLULOSE SOLUTION

|  | Pounds | Percent by Weight |
|---|---|---|
| Nitrocellulose | 463.5 | 23.4 |
| Ethanol | 249.0 | 12.5 |
| Ethyl acetate | 73.7 | 3.8 |
| Butyl acetate | 304.5 | 15.4 |
| Butanol | 185.5 | 9.3 |
| Toluol | 705.5 | 35.6 |
|  | 1,981.7 | 100.0 |

For the purpose of example, there is listed below a preferred formulation made according to this invention. It is to be understood that this formulation, however, is for the purpose of illustration only, and that various substitutions of chemical equivalents and changes and ranges may be made by those skilled in the art in accordance with the description herein.

Example

|  | Pounds | Percent |
|---|---|---|
| Formic acid (90% strength) | 0.625 | 8.0 |
| 2-Nitropropane | 3.121 | 40.0 |
| Dibasic acid ester condensate solution | 1.854 | 23.6 |
| Plasticizer | 0.250 | 3.2 |
| Nitrocellulose solution | 1.980 | 25.2 |
|  | 7.830 | 100.0 |

FORMULATION AND APPLICATION

In the formulation of the example listed above and in other similar formulations according to the teachings of this invention, the various components may be simply added together and mixed. No critical controls other than the proportions indicated are required, nor is there any procedural formulation required in the adding of one component to the other. The entire formulation may be simply mixed together at ambient conditions, such as normal room temperature, without the requirement of any heat, which is a single advantage.

The formulation produced is very stable and may be packaged and shipped under various conditions of service without breakdown. The liquid formulation is adapted for very simple applications for the end user, such as in a spray gun or by brushing upon nylon. Once the nylon base has been so treated, conventional lacquers, such as nitrocellulose lacquers, may be employed over the treated base which may be considered as a primer coated base. The nitrocellulose in the formulation of this invention has a special advantage in providing for combination with the dibasic acid ester condensate to form a coating firmly adhering to the nylon and for compatibility and fusion between the primer and the finished coating.

Where desired, however, the primer may be used as the sole coating and, if desired, with the addition of chemically inert pigments as will be apparent to those skilled in the art. Thus, carbon black, titanium dioxide, and other chemically inert pigments may be employed for coloring to the desired degree.

The drawing shows a typical nylon article 10 coated by the formulation of this invention. Thus, a nylon backing 11 is shown in the figure provided with the coating 12. Additional coatings may, of course, be applied over the coating 12, where desired, as fully pointed out above.

If desired, the formulation may be made in component mixtures which may be added to one another shortly before the liquid coating is to be applied to the nylon base. Such a procedure may be desired where conditions such as long periods of storage or extraneous physical conditions might tend to cause a deterioration or instability of the finished formulation. One such mixture can be singly formulated by mixing the dibasic acid ester condensate with the nitrocellulose and separately mixing the formic acid with the nitroparaffin and plasticizer and then combining the two liquid formulations when the formulation is desired to be used. Alternatively, all of the components may be mixed together except for the formic acid which may be added shortly before the formulation is desired to be used. Under some prolonged subjection to physical influences, as mentioned above, there may be an adverse effect on the liquid formulation and, for this reason, the formic acid may be kept separately from the dibasic acid ester condensate and the nitrocellulose until such physical influences have been obviated or shortly before the formulation is to be applied to the nylon.

There has been provided by this invention a nylon coating which may be very simply applied to nylon under nontoxic conditions in a very simple application. The formulation is one that lends itself to easy manufacture from readily available components without the requirement of critical process or rigorous controls. The finally produced liquid formulation is very simply shipped with a high degree of stability and can be simply applied by relatively unskilled workmen, who need not be trained chemists. Because of the nontoxic characteristics of the liquid formulation, it may be employed without any necessity of rigid safety precautions.

The nylon base, of course, may be in any form of a long chain polymeric amide with recurring amide groups as an integral part of the main polymer chain, as is well-known in the art. Once treated with the liquid formulation of this invention, the nylon base has a tough coating which firmly adheres to the base and does not peel off under rigid wear or service conditions or adverse weathering. Since the liquid formulation of this invention may be used as a primer coat or as a finished end coating, a very high degree of adaptability is obtainable, which makes this invention of signal advantage in this field.

Various changes in the chemical constituents employed and variation in the ranges may be utilized as will be readily apparent to those skilled in the art. Such changes and modifications are, however, within the scope and teaching of this invention as defined by the claims appended hereto.

What is claimed is:

1. A liquid coating composition consisting essentially of formic acid, a liquid nitroparaffin, a dibasic acid ester condensate and nitrocellulose, said nitroparaffin being present in the amount of about 10 to 40% by weight, and the formic acid being present in the amount of about 6 to 10% by weight.

2. A liquid coating composition consisting essentially of formic acid, a liquid nitroparaffin, nitrocellulose and a dibasic acid ester condensate, said condensate having an acid number above 50 and being the reaction product of fumaric acid and rosin.

3. A nylon coated article characterized by the toughness and tenacity of the coating upon the nylon, said composition comprising a nylon base and a coating consisting essentially of formic acid, a liquid nitroparaffin, a dibasic acid ester condensate and nitrocellulose.

4. A nylon coated article characterized by the toughness and tenacity of the coating upon the nylon, said composition comprising a nylon base and a coating consisting essentially of formic acid, a liquid nitroparaffin, a dibasic acid ester condensate and nitrocellulose, said formic acid being present in the amount of about 6 to 10% and said nitroparaffin being present in the amount of about 10 to 40%.

5. A method for coating a nylon base with a lacquer which comprises coating it with a primer coat of formic acid, a liquid nitroparaffin, a dibasic acid ester condensate and a nitrocellulose, and then applying a nitrocellulose lacquer on top of the primer coat.

6. A method for coating a nylon base with a lacquer which comprises coating it with a primer coat of formic acid, a liquid nitroparaffin, a dibasic acid ester condensate and a nitrocellulose.

References Cited in the file of this patent

UNITED STATES PATENTS

| | | |
|---|---|---|
| 2,125,484 | Bogin | Aug. 2, 1938 |
| 2,588,335 | Dalton | Mar. 11, 1952 |
| 2,606,845 | Van Etten | Aug. 12, 1952 |
| 2,702,255 | Yaeger | Feb. 15, 1955 |
| 2,707,157 | Stanton et al. | Apr. 26, 1955 |
| 2,712,987 | Storro et al. | July 12, 1955 |

FOREIGN PATENTS

| | | |
|---|---|---|
| 652,012 | Great Britain | Apr. 11, 1951 |